United States Patent
Fotta et al.

(10) Patent No.: US 8,964,956 B2
(45) Date of Patent: *Feb. 24, 2015

(54) SYSTEM AND METHOD FOR INTEGRATED COMPLIANCE AND CONTACT MANAGEMENT

(75) Inventors: Keith A. Fotta, Duxbury, MA (US); Richard P. Boudrieau, Duxbury, MA (US)

(73) Assignee: Gryphon Networks Corp., Norwood, MA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 11/302,958

(22) Filed: Dec. 13, 2005

(65) Prior Publication Data

US 2007/0136789 A1 Jun. 14, 2007

(51) Int. Cl.
*H04M 3/42* (2006.01)
*H04M 3/436* (2006.01)
(Continued)

(52) U.S. Cl.
CPC .............. *H04L 63/101* (2013.01); *G06Q 10/10* (2013.01); *H04L 12/5855* (2013.01); *H04L 12/589* (2013.01); *H04L 51/14* (2013.01); *H04L 51/36* (2013.01); *H04L 12/585* (2013.01)
USPC .................. 379/201.01; 379/196; 379/265.09; 370/352

(58) Field of Classification Search
USPC ............. 379/201.01, 210.01, 210.02, 265.09, 379/196–200, 188, 202.01–206.01
See application file for complete search history.

(56) References Cited

U.S. PATENT DOCUMENTS

| | | | |
|---|---|---|---|
| 5,499,289 | A | 3/1996 | Bruno et al. |
| 5,960,073 | A | 9/1999 | Kikinis et al. |

(Continued)

FOREIGN PATENT DOCUMENTS

| | | |
|---|---|---|
| EP | 0 946 022 A2 | 9/1999 |
| EP | 1 503 604 A2 | 2/2005 |

(Continued)

OTHER PUBLICATIONS

Myers, J., *Network Working Group, Request for Comments: 2222*: 1-16 (Oct. 1997), http://www.ietf.org/rfc/rfc2222.txt Nov. 11, 2003.

(Continued)

*Primary Examiner* — William Deane, Jr.
(74) *Attorney, Agent, or Firm* — Hamilton, Brook, Smith & Reynolds, P.C.

(57) ABSTRACT

A method and system for integrating compliance and contact management between an origin and destination. An integrated control system can receive or initiate a request for a first communication contact type (e.g. phone call) between an origin and destination, the request including a first destination identifier (e.g. phone number). Depending on applicable mediation rules and lists of prohibited and exempted destination identifiers for the first communication contact type, the connection is either prohibited or allowed. If the first communication contact type is prohibited, a request for an alternate communication type (e-mail, mail, or facsimile) is sent to the same destination based on alternate destination identifiers. The integrated control system will either prohibit or allow the requested alternate communication contact based on one or more applicable mediation rules and lists of prohibited and exempted destination identifiers for each alternate communication contact type. A destination may then "opt-in" to other communication types, including the first communication type, and all mediation rules and lists for each destination identifier associated with the destination can be updated appropriately.

16 Claims, 5 Drawing Sheets

(51) Int. Cl.
*H04L 12/66* (2006.01)
*H04L 29/06* (2006.01)
*G06Q 10/10* (2012.01)
*H04L 12/58* (2006.01)

(56) References Cited

U.S. PATENT DOCUMENTS

| | | | |
|---|---|---|---|
| 5,999,932 A | 12/1999 | Paul | |
| 6,049,782 A | 4/2000 | Gottesman et al. | |
| 6,052,709 A | 4/2000 | Paul | |
| 6,081,591 A | 6/2000 | Skoog | |
| 6,081,592 A | 6/2000 | Battle | |
| 6,092,099 A | 7/2000 | Irie et al. | |
| 6,130,937 A | 10/2000 | Fotta | |
| 6,249,575 B1 | 6/2001 | Heilmann et al. | |
| 6,321,267 B1 | 11/2001 | Donaldson | |
| 6,330,317 B1* | 12/2001 | Garfinkel | 379/196 |
| 6,493,007 B1 | 12/2002 | Pang | |
| 6,643,686 B1 | 11/2003 | Hall | |
| 6,788,773 B1 | 9/2004 | Fotta | |
| 6,853,717 B1 | 2/2005 | Frentz et al. | |
| 7,020,259 B2 | 3/2006 | Hussain et al. | |
| 7,023,980 B2 | 4/2006 | Lenard | |
| 7,158,630 B2 | 1/2007 | Fotta et al. | |
| 7,162,474 B1* | 1/2007 | Harker et al. | 707/9 |
| 7,194,075 B2 | 3/2007 | Fotta | |
| 7,212,620 B1* | 5/2007 | Mastro | 379/210.03 |
| 7,215,760 B2* | 5/2007 | Lenard | 379/266.07 |
| 7,231,029 B1 | 6/2007 | Kirkpatrick | |
| 7,333,798 B2 | 2/2008 | Hodge | |
| 7,412,049 B1* | 8/2008 | Koch | 379/210.02 |
| 7,461,263 B2 | 12/2008 | Prince | |
| 7,474,741 B2* | 1/2009 | Brunson et al. | 379/88.17 |
| 7,536,437 B2* | 5/2009 | Zmolek | 709/206 |
| 7,574,471 B2 | 8/2009 | Fotta et al. | |
| 8,005,200 B2 | 8/2011 | Fotta et al. | |
| 8,050,394 B2 | 11/2011 | Fotta et al. | |
| 8,249,232 B2 | 8/2012 | Fotta et al. | |
| 8,385,524 B2 | 2/2013 | Fotta et al. | |
| 8,526,428 B2 | 9/2013 | Fotta et al. | |
| 8,634,528 B2 | 1/2014 | Fotta et al. | |
| 2002/0075303 A1 | 6/2002 | Thompson et al. | |
| 2002/0152272 A1 | 10/2002 | Yairi | |
| 2002/0169954 A1 | 11/2002 | Bandini et al. | |
| 2003/0041126 A1 | 2/2003 | Buford et al. | |
| 2003/0074286 A1 | 4/2003 | Rodrigo | |
| 2003/0074397 A1 | 4/2003 | Morin et al. | |
| 2003/0093320 A1 | 5/2003 | Sullivan | |
| 2003/0126218 A1 | 7/2003 | Sakonsaku | |
| 2003/0132972 A1 | 7/2003 | Pang | |
| 2003/0135737 A1 | 7/2003 | Bouthors | |
| 2003/0212566 A1* | 11/2003 | Fergusson et al. | 705/1 |
| 2003/0217079 A1 | 11/2003 | Bakalash et al. | |
| 2004/0017899 A1 | 1/2004 | Garfinkel et al. | |
| 2004/0066926 A1 | 4/2004 | Brockbank et al. | |
| 2004/0109557 A1 | 6/2004 | Lenard | |
| 2004/0114747 A1 | 6/2004 | Trandal et al. | |
| 2004/0148506 A1 | 7/2004 | Prince | |
| 2004/0198317 A1 | 10/2004 | Ishida | |
| 2005/0031107 A1 | 2/2005 | Fotta | |
| 2005/0074114 A1 | 4/2005 | Fotta et al. | |
| 2005/0131760 A1 | 6/2005 | Manning et al. | |
| 2005/0144279 A1 | 6/2005 | Wexelblat | |
| 2005/0177599 A1 | 8/2005 | Goodman | |
| 2005/0226151 A1 | 10/2005 | Fotta et al. | |
| 2005/0226221 A1 | 10/2005 | Fotta et al. | |
| 2005/0249209 A1 | 11/2005 | Fotta et al. | |
| 2006/0159060 A1 | 7/2006 | Fotta et al. | |
| 2011/0280386 A1 | 11/2011 | Fotta et al. | |
| 2013/0251130 A1 | 9/2013 | Fotta et al. | |

FOREIGN PATENT DOCUMENTS

| | | |
|---|---|---|
| JP | 64-054853 | 3/1989 |
| JP | 02-312430 | 12/1990 |
| JP | 10-304430 | 11/1998 |
| JP | 2001-036670 | 2/2001 |
| JP | 2001-203793 A | 7/2001 |
| JP | 2003-289376 A | 10/2003 |
| JP | 2004-140733 A | 5/2004 |
| JP | 2004-274256 | 9/2004 |
| JP | 2005-056419 A | 3/2005 |
| WO | WO 98/51062 A1 | 11/1998 |
| WO | WO 03/054764 A1 | 7/2003 |
| WO | WO 03/107644 A1 | 12/2003 |
| WO | WO 2006/115909 A1 | 11/2006 |
| WO | WO 2007/041436 | 4/2007 |

OTHER PUBLICATIONS

Myers, J., *Network Working Group, Request for Comments: 2554*: 1-11 (Mar. 1999).
Franks, J., et al., Network Working Group, Request for Comments: 2617: 1-34 (Jun. 1999), http: //www.ietf.org/rfc/rf c.2617.txt?number=261 7 Nov. 11, 2003.
"Managing Inbound Spam in Lotus Domino 6," presented by Lotus Developer Domain, pp. 1-28.
"InboxMaster™ Brochure," from Secluda Technologies, Inc.™ (11 pp) (2003).
"Do Not Call", presented by Mutual of Omaha, pp. 1-4 (2004).
"Do-Not-Call Compliance", presented by VeriSign, pp. 1-7 (2004).
International Search Report of PCT/US2006/038322, date of mailing Jan. 22, 2007.
International Search Report of PCT/US2006/014584, date of mailing Jul. 27, 2006.
Office Action mail date Jan. 27, 2009, U.S. Appl. No. 10/820,452.
Office Action mail date Feb. 4, 2009, U.S. Appl. No. 11/021,564.
Office Action mail date Jul. 20, 2009, U.S. Appl. No. 11/111,494.
Office Action mail date Jun. 25, 2009, U.S. Appl. No. 11/242,614.
International Preliminary Report on Patentability, International Appl. No. PCT/US2006/014584, issued Oct. 23, 2007.
International Preliminary Report on Patentability, International Appl. No. PCT/US2006/038322, mailed Apr. 17, 2008.
Communication pursuant to Article 94(3) EPC, dated Dec. 3, 2009, EP 06 750 590.9.
International Search Report from International Application No. PCT/US05/31435 dated Feb. 24, 2006.
Office Action dated Apr. 21, 2008, U.S. Appl. No. 10/820,452.
Office Action dated Nov. 13, 2009, U.S. Appl. No. 10/820,452.
Office Action dated Oct. 27, 2009, U.S. Appl. No. 11/021,564.
Office Action dated Mar. 21, 2008, U.S. Appl. No. 11/111,494.
Office Action, Mail Date Jan. 9, 2009, U.S. Appl. No. 11/111,494.
Office Action dated Dec. 28, 2009, U.S. Appl. No. 11/242,614.
Office Action dated Apr. 26, 2010, U.S. Appl. No. 11/021,564.
Office Action dated Mar. 11, 2010, U.S. Appl. No. 11/111,494.
Office Action dated Apr. 12, 2010, U.S. Appl. No. 10/820,452.
Office Action dated Jan. 19, 2011, U.S. Appl. No. 11/111,494.
Notice of Allowance dated Feb. 2, 2011, U.S. Appl. No. 11/242,614.
Office Action dated Mar. 17, 2011, U.S. Appl. No. 10/820,452.
Notice of Allowance dated Apr. 18, 2011, U.S. Appl. No. 11/021,564.
Final Office Action in U.S. Appl. No. 11/111,494, Mail Date: May 24, 2011.
Notice of Allowance in U.S. Appl. No. 11/242,614, Mail Date: Jun. 23, 2011.
Office Action in U.S. Appl. No. 13/187,943, Date Mailed: Oct. 12, 2011.
Notice of Allowance in U.S. Appl. No. 10/820,452, Mail Date: Dec. 7, 2011.
Notice of Allowance in U.S. Appl. No. 10/820,452, Mail Date: May 8, 2012.
Office Action in U.S. Appl. No. 13/187,943, Mail Date: Apr. 26, 2012.
Notice of Allowance and Fee(s) Due mailed from USPTO on Apr. 25, 2013 for U.S. Appl. No. 11/111,494.

(56) References Cited

OTHER PUBLICATIONS

Office Action dated Aug. 3, 2010, issued in U.S. Appl. No. 11/111,494.
Office Action dated Aug. 13, 2010, issued in U.S. Appl. No. 11/242,614.
Notice of Allowance dated Sep. 18, 2013, U.S. Appl. No. 13/892,091.
Office Action in U.S. Appl. No. 11/111,494, Mail Date Jul. 25, 2012.
Notice of Allowance in U.S. Appl. No. 13/187,943, Mail Date Oct. 26, 2012.
Final Office Action dated Jan. 11, 2013, issued in U.S. Appl. No. 11/111,494.
Office Action dated Oct. 7, 2010, issued in U.S. Appl. No. 10/820,452.
Office Action dated Oct. 15, 2010, U.S. Appl. No. 11/021,564.

* cited by examiner

SYSTEM AND METHOD FOR INTEGRATED COMPLIANCE AND CONTACT MANAGEMENT

BACKGROUND OF THE INVENTION

Customer and potential customer outreach is an important aspect of conducting business. Because of the multiple communications types at their disposal, organizations can perform this outreach using any number of contact types, including telephone calls, facsimile transmissions, electronic mails ("e-mails"), instant messaging and postal mail.

Recently, federal and state solicitation laws and regulations have mandated that a consumer, who expresses a desire not to be solicited by telephone, facsimile, or other electronic media such as e-mail, not be called, faxed or e-mailed. By regulation, such as the United States Federal Trade Commission's (FTC) Telemarketing Sales Rules (TSR), a business must maintain a list of telephone numbers for such consumers, known as a "Do-Not-Call" (DNC) list, and take appropriate measures to ensure that outgoing calls to telephone numbers on a DNC list are somehow blocked. The federal government is also considering the establishment of a federal "Do-Not-E-Mail" list to enable a consumer to prevent electronic mail solicitations.

The DNC lists can include one or more lists specific to a particular business, as well as state-wide, national and industry-imposed lists such as the Direct Marketing Association (DMA) Telephone Preference Service (TPS) list. A single violation of a federal and/or State DNC regulation may result in a substantial fine. Thus, compliance management is a particularly critical and challenging issue for businesses that rely on solicitations as a core marketing tool.

SUMMARY OF THE INVENTION

Federal and state solicitation laws and regulations, combined with organizations' efforts to communicate with customers and prospective customers in a manner that recognizes individual communication preferences, makes business communications difficult to manage. Particularly, because there may be different means for reaching a customer or prospective customer, e.g. phone communication, facsimile communication, e-mail, instant messaging or postal mail, coordinating the use of these various communication means within an organization would be beneficial.

Systems exist for handling DNC compliance management as well as for accommodating cases in which a blocked or prohibited number may be reached based on certain exemptions to the regulations, such as existing business relations. Systems also exist for handling communications compliance for facsimile, e-mail and mail. In addition, Customer Relations Management systems exist for organizing and handling communications preferences.

The present invention provides a method of integrating compliance and contact management between an origin and destination. An integrated control system can receive or initiate a request for a first communication contact type (e.g. telephone call, facsimile transmission, e-mail, instant message, mail) between an origin and destination, the request including a first destination identifier (e.g. domestic or international phone number, fax number, Internet Protocol address, e-mail address, instant messaging address, or a national or international mailing address). Depending on applicable mediation rules and lists of prohibited and exempted destination identifiers for the first communication contact type, the connection is either prohibited or allowed. If the first communication contact type is prohibited, a request for an alternate communication type (e-mail, mail, or facsimile) is sent to the same destination based on alternate destination identifiers. The integrated control system will either prohibit or allow the requested alternate communication contacts based on one or more applicable mediation rules and lists of prohibited and exempted destination identifiers for each alternate communication contact type. A destination may then "opt-in" to other communication types, including the first communication type, and all mediation rules and lists for each destination identifier associated with the destination can be updated appropriately.

An integrated control system can bridge a number of different contact connection units. A connection unit may be an Interactive Voice Response (IVR) application, a predictive dialer server, a distributed predictive dialer system, a switch, router, or an electronic mail server. The connection unit typically provides a bridging capability to make a communications contact from an origin to a destination. The destination identifier may be a communications device address such as a domestic or international telephone number, Internet Protocol address, fax number, an electronic mail address, and instant messaging address or even a domestic or international mailing address. "Prohibited" destination identifiers may be identifiers that have been designated by a governmental authority, private organization, client, customer, or other party as blocked or prohibited from being connected to or contacted by a particular client or all clients. "Exempted" destination identifiers may be identifiers that have been designated by a governmental authority, private organization, client, customer, or other party as being exempted from being a prohibited destination identifier.

The prohibited and exempted destination identifier lists may be contained within one or more tables of one or more databases. Also, the lists of prohibited destination identifiers may be derived from any one or a combination of a Federal Do-Not-Call list, a State Do-Not-Call list, a DMA Do-Not-Call list, client internal lists, a Very Important Person list, and other defined lists. Furthermore, the lists of exempted destination identifiers may be derived from any one or a combination of an Existing Business Relationship (EBR) exemption list, Do-Not-Call exemption list, State Do-Not-Call exemption list, a VIP exemption list, and other exemption lists. The exemption lists may also contain any one or combination of exemption key, type, and date of contact associated with each exempted destination identifier. These lists may apply to any of the communication contact types.

Mediation rules may be used to determine a sequence of comparisons made between a destination identifier and one or more lists of exempted and prohibited identifiers wherein each comparison with a list of exempted identifiers determines whether the comparison with an associated list or lists of prohibited destination identifiers is bypassed or ignored. An associated list of prohibited destination identifiers is "bypassed" when the comparison with the prohibited destination list is not performed. An associated list of prohibited destination identifiers is "ignored" when the comparison with the prohibited destination list is performed, but no action to control the communications connection based on the result is taken. The result is only logged in an audit record for some other purpose such as record keeping or performing a statistical analysis of the control system. If the prohibited destination list is not bypassed or ignored, a comparison is performed, resulting in an action to possibly prohibit or allow the communications connection. The prohibited and exempted destination lists may be modified from an origin or a secondary interface such as a World-Wide-Web (WWW) connection from a remote computer or an automated remote process from a client site.

The integrated control system can be a single integrated control unit found on a computer server that resides on the premises of a client, a local exchange carrier, local administration facility, central administration facility, or other remote facility. The integrated control unit may interface with local prohibited and exempted destination lists. These local prohibited and exempted destination lists may be periodically synchronized with other prohibited and exempted destination lists that are remotely located at another facility such as a local administration facility, local exchange carrier, central administration facility, or another facility. The integrated control unit may also be a software application within a remote client computer that accesses an internal or remote prohibited and exempted lists within a central administration facility.

Alternatively, various components to an integrated control system may be distributed over a network, with components physically located on either the premises of a client, a local exchange carrier, local administration facility, central administration facility, or other remote facility. The management of these components may be at centralized facility, or distributed among the various components.

For each contact type, the prohibited and exempted destination lists may be dynamically added or removed and the mediation rules updated to flexibly adapt the system to continuously support new connection prohibition rules. This may be done individually with respect to each type of contact connect unit, or may be managed centrally by the client or through the use of a CRM system. Multiple destination identifiers may be examined in relation to a particular origin to determine whether to prohibit or allow communications connections between the origin and each of the multiple destinations. For security reasons, each client user may be identified and authenticated.

The integrated control system, based on the mediation rules, may also use additional client and customer information to determine whether to prohibit or allow a communications connection such as a client user identifier, client identifier, customer identifier, client office identifier, product identifier, geographic area, date, time, exemption type duration, origin identifier, internal client criteria, or internal customer criteria. The integrated control unit may also generate logs of communications connections having prohibited, allowed, and improper destination identifiers. These logs may provide a profile of a given destination over various communication contact types, and correlate.

Another embodiment of the present invention also includes an integrated analysis system and method for selectively designating whether a communications connection type between an origin and one or more destinations are prohibited. The integrated analysis system typically includes an interface unit that receives one or more proposed destinations, at least one list of prohibited destination identifiers, at least one list of exempted destination identifiers, and an integrated analysis unit that designates whether the communication contact between an origin and one or more proposed destinations are prohibited or allowed based on one or more mediation rules and the list of prohibited and exempted destination identifiers.

The integrated analysis system performs a pre-check of one or more proposed destination identifiers and generates a list that designates which destination identifiers are prohibited or allowed. This list can provide destination identifiers across multiple contact types, and may include additional information such as information regarding the customer preferred communication contact types, and the customer's preferred time of contact. A client user or agent may then review the list and decide which destinations to contact. The analysis system may be preferred by small business clients with a smaller customer base and less resources to contact customers. The integrated analysis system may reside at the central administration facility and be remotely accessed by a client. Alternatively, the integrated analysis system may be a computer application within a client's computer system that accesses a remote or internal list of prohibited and exempted destination identifiers.

Once contact between a client origin and a customer destination, a destination may have the opportunity to "opt-in" to receiving different communication contact types from the client. Because of various or other restrictions that require an organization to contact a customer or potential customer that opts-in within a certain period of time, an aspect of the present the invention includes a notifying the client that a customer contact must be made within a certain period. When the period of time expires, the permission to make that contact with the customer or potential customer expires as well. Therefore, if contact is not made through the "opted-in" communication type, the customer destination identifier corresponding to that contact type is removed from the appropriate exemption list. Alternatively, the destination identifier for the "opted-in" communication type communication, may be placed on a "pending list," and unless contact is made in the appropriate time period, is never put on the exemption list.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
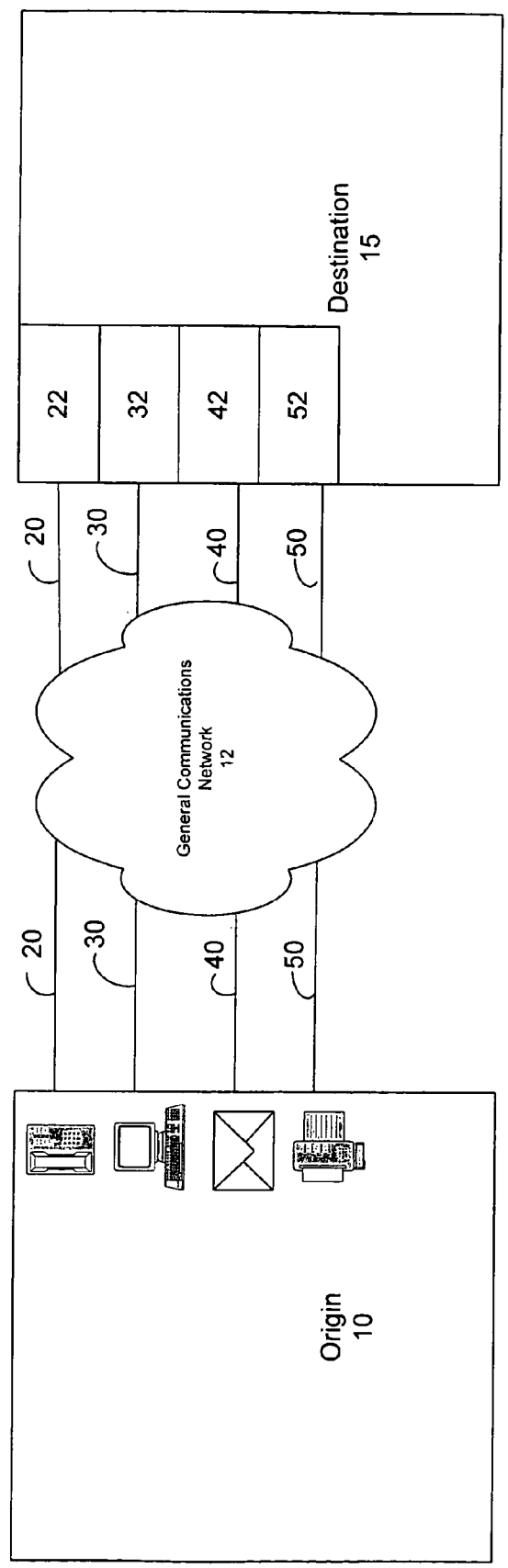
FIG. 1 is a high level diagram showing the various communications contacts between an origin and a destination, where an integrated compliance and contact control unit of the present invention may be employed.

One embodiment of the present invention is a control system for integrating compliance and contact management from an origin to a destination. FIG. 1 shows an origin 10 and a destination 15, and the various communications contacts between them, where an integrated compliance and contact control unit of the present invention may be employed. An origin 10 may contact a destination 15 through a phone call 20, an e-mail 30, a direct mailing 40, or a facsimile 50. Depending on the contact type, the origin and destination may be bridged by a number of different contact type networks or delivery means, e.g. telephone network, internet, postal service (not shown) that comprise a general communication network 12. Other contact methods (not shown) may also be employed. A destination may have respective destination identifiers 22, 32, 42, 52, for some or all of those communication contact types. In making outgoing contacts, a particular origin 10 may have contact information for many different destinations 15.

Figure 2:
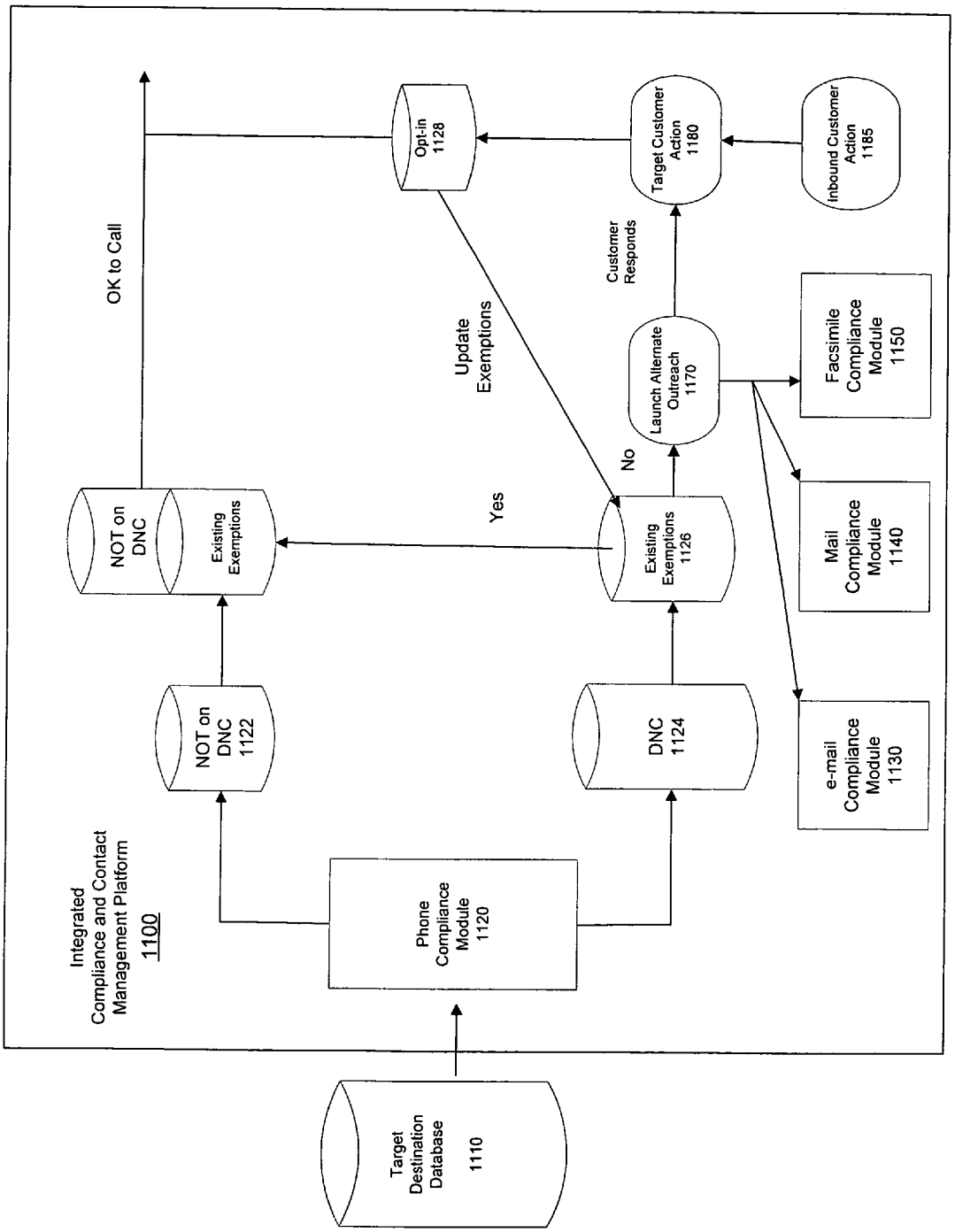
FIG. 2 is a schematic flow diagram showing the steps for outgoing customer contact using an integrated compliance and contact control unit according to the principles of the present invention.

FIG. 2 shows an example of an integrated control system 1100 that illustrates principles of the present invention. It is understood, however, that the present invention applies to any communications system and, more particularly, to allowing or prohibiting a communications connection between an origin and destination over multiple communications means therein.

FIG. 2 illustrates a schematic flow diagram showing the steps for outgoing customer contact using an integrated compliance and contact control unit 1100 according to the principles of the present invention. An organization has a target destination database 1110 of customers or potential customers that the organization seeks to contact. This database may contain either a single destination identifier, such as a phone number, or preferably it will contain a destination profile that includes a number of different destination identifiers corresponding to each target destination over various communication contact types.

In the embodiment of FIG. 2, a phone compliance module operates to selectively prohibit or allow a communications connection between the origin and the destination. An exemplary phone control compliance module is described in patent application Ser. No. 11/021,564 entitled, "System and Method for Control of Communication Connections and Notifications" filed Dec. 23, 2004, which is incorporated herein by reference. If a particular destination phone number is not on a DNC list 1122, then the contact request continues. If the destination is on a DNC list 1124 then the number is checked against a list of exemptions 1126, such as destinations with existing business relations, which would allow the contact to continue. If no such exemption exists, an alternate out reach is performed 1170. This alternate outreach mechanism 1170 would identify an alternate destination identified, such as an e-mail address, that would correspond to the target destination. The alternate contact request may have its own prohibitions and exemptions.

Once an alternate outreach method is employed, the customer may be asked to take some action to "opt-in" to a particular communication type, such as a phone communication shown in FIG. 2. As an example, the customer may be asked to send a reply e-mail, click a Uniform Resource Locator ("url") link, or fill out a return receipt post card. If the customer or potential customer takes this action 1180, the destination identifier may be considered to have been opted-in 1128. Once the destination identifier is opted-in 1128, the organization may then contact them through the destination identifier and update the exemption database 1126 to include that destination identifier. In addition, there may be applicable laws or other restrictions that require an organization to contact a customer or potential customer that opts-in within a certain period of time. When the period of time expires, the permission to make that contact with the customer or potential customer expires as well. Therefore, another aspect of the invention includes a notification to the client, indicating that a customer contact must be made within a certain period, and removing the customer destination identifier from the appropriate exemption list if that contact is not made.

For each of the various communication types, different outreach rules may apply. A given target customer may have a phone number on the DNC list and may have opted onto a company's Do-Not-Fax list, but may willing to accept e-mail solicitations or mail solicitations.

Figure 3:
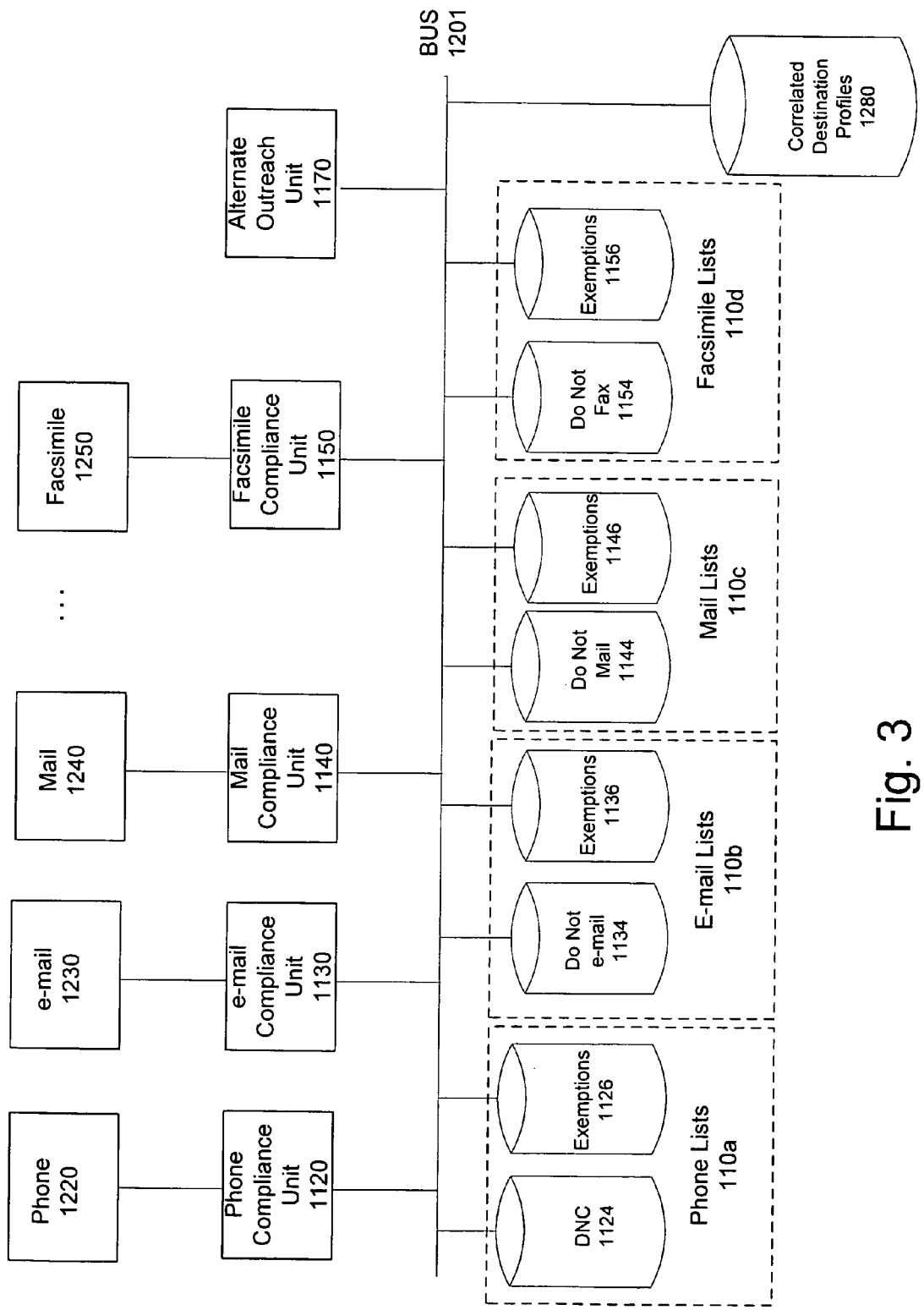
FIG. 3 is a high level diagram showing the functional modules of an integrated compliance and contact control unit according to the principles of the present invention.

FIG. 3 illustrates a high-level diagram showing the functional modules of an integrated control system, where each compliance unit keys into different lists corresponding to the communication type. Any combination of the various functional communication outreach methods (e.g. phone 1120, e-mail 1130, mail 1140, facsimile 1150), may be used in a system for making customer or prospective customer contact. Other communications may also be employed consistent with the principles of the present invention.

If a company wishes to make an outgoing phone contact with a customer through phone 1220, the outgoing call receives call compliance treatment at phone compliance unit 1120. Phone compliance unit 1120 accesses phone contact database 110a, containing one of more tables of prohibited and exempted destination identifiers. In FIG. 3, database 10a contains a do-not-call list 1124 and an exemption list 1126. The do-not-call list and the exemption list may exist is separate databases, or they may exist in a single database. In addition, this database may exist locally on a business's premise, or a remote location may host the information.

If the company is prohibited from contacting its target destination via phone, an attempt to contact the target destination through an alternate outreach method such as an e-mail 1230, mailing 1240 or a fax transmission 1250. Although not shown, alternate outreach methods such as instant messaging may be used. Each of these alternate communication contact types will have its own communication compliance treatment.

As shown in FIG. 3, e-mail compliance unit 1130 accesses an e-mail contact database 110b containing a do-not-e-mail list 1134 and an exemption list 1136 to determine whether the business may contact a particular destination. Likewise, a compliance unit 1140 bridges an outgoing mail service 1240 and a mail contact database 110c containing both a do-not-mail list 1144 and an exemption list 1146. Companies may employ internal mailing methods for addressing outgoing mailings, or they may use direct mailhouses to send mass mailings on their behalf. In either case, the mail compliance unit 1140 and/or the do not mail list 1144 and the exemption list 1146 may be hosted on the company's premise, at a direct mailhouse, or be distributed among different host locations. The fax compliance unit 1150 bridges an outgoing facsimile unit 1250 and a fax contact database 110d containing a do-not-fax list 1154 and an exemption list 1156. While the use of exemption lists has been described herein, certain companies may choose not to employ list of exempted destination identifiers. Consistent with the principles of the present invention, the integrated compliance system may operate using only lists of prohibited destination identifiers, or using exemption lists only for select communication contact types.

A particular customer may correspond to a particular destination profile (referred to interchangeably as a "customer profile") that is housed in database 1280 which correlates all the destination identifiers for each alternate outreach method. For example, a customer's phone number, e-mail address, mailing address, and fax number may exist in database 1280. Additional information regarding a customer may also exist in database 1280, such as call preference times, and communication contact type preferences. A Customer Relationship Management system ("CRM") may be used to manage the destination profiles 1280.

A prohibited contact attempt, through one communication contact type, may prompt a particular compliance unit 1120, 1130, 1140, 1150 to initiate an alternate outreach method. Alternatively, a management unit, such as alternate outreach 1170, may coordinate the alternate outreach attempts. It will be understood by one of ordinary skill in the art that the functional components of the system shown in FIG. 3 may be housed in a single central processing unit, in a distributed processing unit, or in separate processors over a communications network. As the various compliance units and databases are connected over a BUS (either local, or networked), allowing compliance and contact management from an origin to a destination to be integrated over the alternate communication contact platforms.

Figure 4:
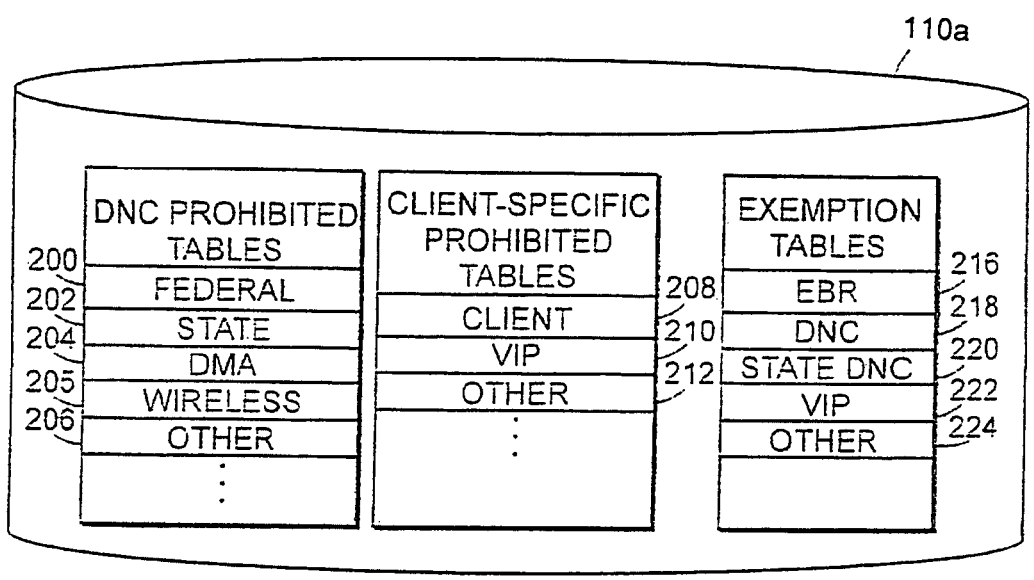
FIG. 4 is a high level diagram of a phone contact database of the communications control system.

As shown in FIG. 4, a phone contact database 10a may have one or more tables of prohibited and exempted destination identifiers. Other communication type databases may be similarly organized. In the particular embodiment shown in FIG. 4, the tables are shown in three groups for descriptive purposes, but may be arranged in any order or configuration. Using a phone contact database as an example, the DNC prohibited tables are tables that typically are the same for any client and include Federal DNC list 200, State DNC list 202, DMA DNC list 204, Wireless DNC list 205, and other DNC lists 206. The client-specific prohibited DNC tables are typically unique to each client and include Client DNC list 208, VIP DNC list 210, and other DNC list 212. The exemption tables may include EBR exemption list 216, DNC exemption list 218, State DNC exemption list 220, VIP exemption list 222, and other exemption lists 224. The destination identifier is usually a network address associated directly or indirectly with a destination communications device or a destination user. For example, the device address may be a telephone number for a device connected to the Public Switched Telephone Network (PSTN), an Internet Protocol (IP) address for a device connected to the Internet, or an electronic mail address for an Internet electronic mail account in an electronic mail server.

In this voice communications scenario, the lists of prohibited destination identifiers may be derived from any one or a combination of a Federal DNC list 200, a State DNC list 202, a DMA list 204, a Wireless DNC list 205, a client internal list 208, or a Very Important Person (VIP) DNC list 210 as shown in FIG. 4. Other lists 206 defined by International, Federal, State, other governmental entities, trade organizations, associations, or private entities may also be included. Other client-specific lists 212 may further be included. In an electronic mail scenario, the list of prohibited destination identifiers may include a client do-not-e-mail list, Domain Name List or IP address list.

The Federal DNC list 200 is typically a copy of the national Do-Not-Call list maintained by the FTC and enforced by the FTC, Federal Communications Commission (FCC), and States officials. Preferably, the list 200 is stored locally in a client database to reduce possible query latencies, but may be accessed remotely by a control unit from a central database or even from a database maintained by the FTC, FCC, or other entity via the Internet or the like.

The state DNC list 202 may include multiple lists with each list associated with a particular state. Depending on the mediation rules, as defined by the client, a control unit may check one state, multiple states, or no state list for prohibited destination numbers. The DMA TPS list 204 is typically derived from a DMA-maintained do-not-call list which is required by certain states to be checked by telemarketers before calling a target customer. The DMA TPS list has millions of destination telephone numbers. A Wireless DNC list 205 may be implemented that contains, for example, a list of cellular telephone or other wireless device addresses such as a telephone numbers, e-mail addresses, IP addresses, or domain name addresses associated with one or more groups of wireless devices.

The client internal DNC list 208 may be a client-specific list that includes destination telephone numbers of customers that have explicitly notified the client that they do not want to be solicited. Client internal DNC list 208 generally trumps all other lists or exemptions. The VIP list 210 may be a client-specific list typically of high value customers that the client does not want general client users or brokers to contact. The other client-specific DNC lists 212 may include a list of states or area codes associated with a particular agent that are prohibited or blocked from contact by the agent. The other client-specific DNC lists 212 may also include lists of area codes associated with particular client offices which are prohibited from contact by the office. The client agent or office restrictions allow a client to possibly prevent agents from different offices in different geographic locations from calling the same customers in a particular state or area code.

The lists of exempted destination identifiers may be derived from any one or a combination of an Existing Business Relationship (EBR) exemption list 216, DNC exemption lists 218, State DNC exemption lists 220, a VIP exemption list 222, or other exemption lists 224.

The EBR exemption list 216 is typically a client-specific list of destination identifiers of customers that may be contacted even though their destination number is contained within DNC list 200, State DNC list 202, or DMA DNC list 204. Under certain condition, depending on the existing business relationship between the client and a customer, certain federal and state regulations allows a particular client to contact a customer even though the customer's destination number is included within list 200, 202, or 204. The EBR list may include, but not be limited to, the following categories:

1. Purchased—Indicates that a customer has purchased a product from the client. Calls to these customers are permitted within the duration specified in the regulations.
2. Leased—Indicates that a customer has leased a product from the client. Calls to these customers are permitted within the duration specified in the regulations.
3. Rented—Indicates that a customer has rented a product from the client. Calls to these customers are permitted within the duration specified in the regulations.
4. Financial Transaction—Indicates that a customer has engaged in a financial transaction with the client. Calls to these customers are permitted within the duration specified in the regulations.
5. Inquiry—Indicates that a customer has made an inquiry with the client. Calls to these customers are permitted within the duration specified in the regulations.

Each of these exemptions may be defined by federal regulations and some states that have EBR regulations. Clients are typically required to choose which of these exemptions a control system will support/elect. Clients typically provide a list of exempted destination identifiers along with the exemption type to a control system administrator who enters the destination identifiers into the EBR exemption list 216 via an interface or can be loaded by automated process from a remote client site or sites. Information included within EBR exemption list 216 may include any one or a combination of an exemption key, exemption type, and date of contact associated with each exempted destination identifier.

The EBR exemption key may be an integer associated with a category of EBR exemption. For example, the "Purchased" EBR exemption may have a key=1 as shown above while the "Inquiry" EBR exemption may have an EBR exemption key=5. The date of contact may be stored with the destination identifier in EBR exemption list 216 to enable a control unit to determine the duration of time in which a particular EBR exemption may be applied. For example, if a customer made an inquiry to the client on a certain date, federal or state regulations may allow the client to apply the exemption and override the Federal DNC list 200, State DNC list 202, or DMA DNC list 204 for a period of 30 days from the date of contact. The duration of each EBR exemption may be different or vary, requiring the use of an EBR exemption key, associated with each exempted destination number, to determine which EBR exemption applies and for what duration of time that EBR exemption is valid. Thus, the EBR exemption key and date of contact may be used by a control unit to identify a particular EBR exemption category and determine whether to apply the EBR exemption, depending on the duration that the exemption is valid from the date of contact.

The DNC exemption lists 218 may be client-specific or agent-specific lists of destination identifiers including, but not limited to, the following categories:

Prior Express Permission—When a customer of a client specifically gives permission to be contacted, the customer's destination identifier, e.g., telephone number, is recorded into a database, allowing the customer to be contacted by the client. This category may be enabled or disabled by the client using a management interface.

Survey—When a customer responds to a client survey, the customer's destination identifier, e.g., telephone number, may be recorded into a database, allowing the customer to be contacted by the client. This category may be enabled or disabled by the client using a management interface.

Personal Relationships—This category allows a client agent to designate certain destination identifiers as their "Friends and Family." Thus, allowing a control unit to bypass all DNC restrictions and allow communications connections to the designated destination identifiers. The destination identifier may be added to a personal relationship DNC exemption list 218 via an IVR interface by the client agent or using a WWW interface from a management interface or some other remote computer connection to a management unit. This category may be enabled or disabled by the client using a management interface.

The State DNC exemption list 220 may be a client-specific list of flags associated with enabling or disabling State call curfews, Intrastate calls, Federal DNC list 200, State DNC lists 202, and DMA DNC list 204. The State DNC exemption list 220 may include, but not be limited, to the following:

Federal flag—this flag setting allows the client to set a control unit to ignore checking federal DNC list 200. The setting may be enabled or disabled by the client using a management interface.

State flag—this setting allows the client to set a control unit to ignore state DNC list 202 for a particular state. Each of the 50 possible states may be individually ignored. The setting may be enabled or disabled by the client using a management interface.

DMA flag—this setting allows the client to set control unit to ignore DMA DNC list 204. The setting may be enabled or disabled by the client using a management interface.

Intrastate flag—this exemption enables a control unit to allow intrastate communications connections to an individual state. For example, if a client believes they are entitled to an exemption allowing them to call into a state (i.e., origin and destination identifiers, e.g., telephone numbers, are from different states), the client may set this option to enable a control unit to override any other intrastate restrictions imposed by a state DNC list 202 or other list. The setting may be enabled or disabled by the client using a management interface.

State Call Curfew flag—this exemption may allow a control unit to ignore the curfew restrictions associated with a particular state while following the federal call curfew rules. A call curfew may only allow communications connections within a designated time period such as 9 a.m. to 6 p.m. The federal call curfew rules may be more liberal than the curfew rules in certain states. Thus, the client has the option to follow the more liberal federal rules. The setting may be enabled or disabled by the client using a management interface.

The High Value customer (VIP) exemption list 222 may be an agent-specific list of destination identifiers that allows certain agents of a client to establish a communications connection with certain VIP clients. As stated previously, a control unit uses VIP DNC list 210 to prohibit a communications connection by agents of a client to certain VIP clients whose destination identifiers are contained in VIP DNC list 210. VIP exemption list 222 enables a control unit to bypass the VIP DNC list 210 check for a particular agent and allow that agent to contact the VIP customer. The destination identifiers may be stored in database 110 by the client using a management interface. The VIP exemption list 222 check may also be enabled or disabled by the client at a management interface.

Database 110 may also include other exemption lists 224 such as a Federal Grace Period List that defines a grace period wherein newly added destination identifiers to the Federal DNC list 200 may be contacted if they were added during the grace period. For example, the grace period may vary between 0 and 90 days. A control unit may check the other exemption lists 222 such as the Federal Grace Period list depending on whether the check is enabled or disabled by the client using a management interface.

While the foregoing lists may preferably be implemented as tables within a database such as databases 110, the lists may also be distributed throughout multiple databases or multiple tables within multiple databases. Also, the prohibited and exempted destination lists within databases 110 may be modified by an agent via an origin using an IVR. Furthermore, the prohibited and exempted destination lists may be modified from a secondary interface such as a management interface or another remote connection to management units, typically using a WWW page interface by an agent or administrator.

Figure 5:
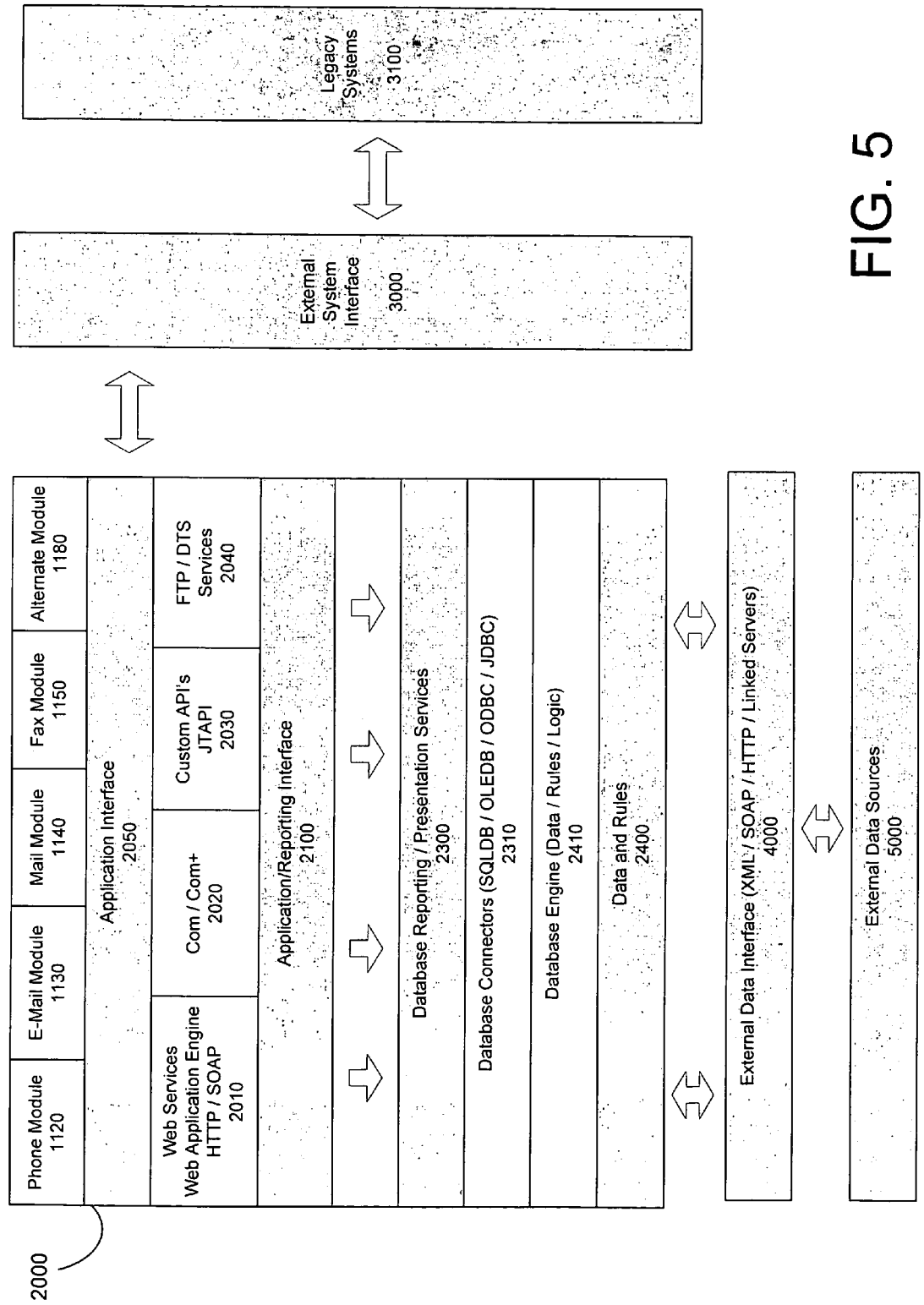
FIG. 5 is a representative diagram of an application stack of one embodiment of the present invention.

FIG. 5 is a block diagram illustrating the organization of an application stack 2000 for operation of integrated appliance and contact management system. Phone compliance module 1120, e-mail compliance module 1130, mail compliance module 1140, and fax compliance module 1150 form the first application layer. Additional communication compliance modules 1180, may be included on this application layer. An application interface layer 2050 allows the various compliance modules to communicate with an application reporting interface layer 2100. Possible application interfaces may include web services 2010, Microsoft Component Object Model (COM/COM+) or .NET technologies 2020, custom Application Program Interfaces (API) using a Java Telephony API (JTAPI) 2030, or File Transfer Protocol (FTP)/Data Transformation Services (DTS) 2040. These application interfaces bridge the compliance module layer with an application reporting interface layer 2100 that may be accessible through a web application engine 2010 that could be viewed over a secured web browser, a VPN, or some other custom application.

The application interface layer 2050 also enables the individual compliance modules to communication with an external system interface 3000 which allows each compliance module to control the various communication contact types and to allow individual management of the particular communication contact type. The external system interface 3000 may communicate with existing legacy systems 3100 to enable the application stack 2000 to integrate with existing compliance systems.

The web application engine 2010 links to the database reporting/presentation services layer 2300 that enables the applications to view the various compliance lists and rules. The database reporting/presentation services layer 2300 includes database connectors 2310 that may operate using relational data by formats such as SQLDB, OLEDB, ODBC, or JBDC. A database engine 2410 provides access to a data and rules layer 2400. The database engine 2410 contains the rules that are applied to each communication contact type. The data and rules layer 2400 communicates with an external data interface via an out-of-band notification message or back-end services in the form of an IP-based Extensible Markup Language (XML) data message, a Simple Object Access Protocol (SOAP), or Hyper Text Transfer Protocol (HTTP). The external database interface layer 4000 allows the application stack 2000 to access an external data storage layer 5000.

According to the foregoing, the present approach provides a method of selectively prohibiting a communications contact from an origin to a destination. The method includes receiving or initiating an outgoing contact request for a first communication contact type from an origin to a destination that includes the destination identifier, prohibiting or allowing the requested communications contact based on one or more mediation rules and lists of prohibited and exempted destination identifiers in databases 110*a*-*d*, and attempting outgoing contact requests for alternate communication contact types. If the first requested communication contact type is prohibited.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of integrating compliance and contact management from an origin to a destination, the method executed by a processor executing program instructions and comprising:
    receiving or initiating an outgoing contact request for a first communication contact type from an origin to a destination, the request including a first destination identifier;
    prohibiting or allowing the requested outgoing contact for the first communications contact type based on one or more mediation rules and lists of prohibited and exempted destination identifiers for the first communication contact type;
    if prohibiting the requested outgoing contact for the first communication contact type, receiving or initiating outgoing contact requests through one or more alternate communication contact types from the origin to the destination, the requests including alternate destination identifiers;
    prohibiting or allowing the requested outgoing contact for any of the alternate communications contact types based on one or more mediation rules and lists of prohibited and exempted destination identifiers for each alternate communication contact type.

2. The method of claim 1 further comprising:
    receiving a response from a destination exempting a destination identifier from the list of prohibited destination identifiers for a particular communication contact type.

3. The method of claim 2 further comprising:
    updating the list exempted destination identifiers for a destination identifier associated with the destination based on the response from the destination.

4. The method of claim 3 further comprising:
    requesting an outgoing contact based on the new destination identifiers updated to the list of exempted destination identifiers.

5. The method of claim 1 wherein the communications contact types are one of: a phone connection, a facsimile transmission, an outgoing e-mail, text messaging, or an outgoing mailing.

6. The method of claim 1 wherein the requests for communication contact types are initiated based on a predetermined priority queue.

7. The method of claim 6 wherein the predetermined priority queue is based on individual destination preferences.

8. The method of claim 1, wherein the compliance and contact management occurs at a central facility or a distributed access facility.

9. A control system for integrating compliance and contact management from an origin to a destination, the system comprising:
    a first control module that receives an outgoing contact request for a first communication contact type from an origin to a destination, the request including a first destination identifier, and prohibits or allows the requested outgoing contact for the first communications contact type based on one or more mediation rules and lists of prohibited and exempted destination identifiers for the first communication contact type;
    an alternate outreach unit that initiates at least a second outgoing contact request through one or more alternate communication contact types from the origin to the destination if the first outgoing contact is prohibited;
    at least a second control module that receives an outgoing contact request through one or more alternate communication contact types from the origin to the destination, the requests including alternate destination identifiers, and prohibits or allows the requested outgoing contact for any of the alternate communications contact types based on one or more mediation rules and lists of prohibited and exempted destination identifiers for each alternate communication contact type;
    at least one database for storing the mediation rules and lists of prohibited and exempted destination identifiers for the communication contact types.

10. The control system of claim 9 further comprising:
an update module for updating mediation rules and lists of prohibited and exempted destination identifiers in at least one database for each destination identifier associated with the destination based on any allowed communication contacts.

11. The control system of claim 9 wherein the communications contact types are one of:
a phone connection, a facsimile transmission, an outgoing e-mail, text messaging, or an outgoing mailing.

12. The control system of claim 9 wherein the requests for communication contact types are initiated based on a predetermined priority queue.

13. The control system of claim 12 wherein the predetermined priority queue is based on individual destination preferences.

14. The control system of claim 9, wherein the control modules and update modules exist in a single processor.

15. The control system of claim 9, wherein the control modules and update modules exist in more than one processor communicating over a network.

16. A non-transitory computer readable medium having computer readable program codes embodied therein for causing a computer to integrate compliance and contact management from an origin to a destination, the computer readable medium program codes performing functions comprising:
receiving or initiating an outgoing contact request for a first communication contact type from an origin to a destination, the request including a first destination identifier;
prohibiting or allowing the requested outgoing contact for the first communications contact type based on one or more mediation rules and lists of prohibited and exempted destination identifiers for the first communication contact type;
if prohibiting the requested outgoing contact for the first communication contact type, receiving or initiating outgoing contact requests through one or more alternate communication contact types from the origin to the destination, the requests including alternate destination identifiers;
prohibiting or allowing the requested outgoing contact for any of the alternate communications contact types based on one or more mediation rules and lists of prohibited and exempted destination identifiers for each alternate communication contact type.

* * * * *